United States Patent [19]
Arai

[11] Patent Number: 5,306,409
[45] Date of Patent: Apr. 26, 1994

[54] CONTROLLING APPARATUS FOR CONTINUOUS ELECTROLYTIC ION WATER PRODUCING APPARATUS

[75] Inventor: Kazuyoshi Arai, Atsugi, Japan

[73] Assignee: Janix Kabushiki Kaisha, Japan

[21] Appl. No.: 944,440

[22] Filed: Sep. 14, 1992

[30] Foreign Application Priority Data

Nov. 10, 1991 [JP] Japan .................... 3-290312

[51] Int. Cl.$^5$ .................... C25B 15/00; C25D 21/00
[52] U.S. Cl. ................................ 204/228; 204/229
[58] Field of Search ............... 204/149, 228, 305, 406, 204/229

[56] References Cited

U.S. PATENT DOCUMENTS

4,734,176  3/1988  Zemba, Jr. et al. ............ 204/149
5,055,170  10/1991  Saito ............................ 204/228

Primary Examiner—John Niebling
Assistant Examiner—Brendan Mee
Attorney, Agent, or Firm—Lorusso & Loud

[57] ABSTRACT

A controlling apparatus which can control a continuous electrolytic ion water producing apparatus so that the electrolyzing capacity of an electrolytic cell is kept fixed against a variation of the flow rate or the quality of water upon passage of water to always achieve optimization and stabilization of electrolytic ion water produced. When water flows through the electrolytic cell, it is energized by a power source circuit to electrolyze the water to obtain electrolytic ion water. When a range change-over switch is manually operated, a dc voltage of the power source circuit is controlled in response to the range change-over switch by a control unit and a switching regulator to produce an electrolyzing voltage corresponding to the operated position of the range change-over switch. The water is thus electrolyzed with an electrolyzing strength of the electrolyzing voltage. During such electrolyzing operation, if the flow rate or the water temperature varies, then the pulse width of the switching regulator is corrected to automatically adjust the electrolyzing strength in accordance with the varying condition thereby to always keep the electrolyzing capacity of the electrolytic cell fixed.

9 Claims, 5 Drawing Sheets

CONTROLLING APPARATUS FOR CONTINUOUS ELECTROLYTIC ION WATER PRODUCING APPARATUS

BACKGROUND OF THE INVENTION

1. Field of the Invention

This invention relates to a continuous electrolytic ion water producing apparatus which electrolyzes water such as city water to continuously produce alkali ion water and acid ion water, and more particularly to a controlling apparatus which controls a continuous electrolytic ion water producing apparatus of the type mentioned so that the electrolyzing capacity may be kept fixed against a variation of the flow rate, the quality of water or the like.

2. Description of the Related Art

A continuous electrolytic ion water producing apparatus which applies a dc voltage between a pair of positive and negative electrodes in drinking water such as city water to electrolyze the drinking water to directly produce alkali ion water and acid ion water is already known. Alkali ion water is used to improve the acid physical constitution, as necessary due to eating habits of moderns principally depending upon meat, while acid ion water is used to wash the surface of the human body and so forth for make-up.

The electrolyzing capacity of an electrolytic cell of an electrolytic ion water producing apparatus of the type mentioned, that is, the hydrogen ion exponent (pH) value of electrolytic ion water produced, depends much upon the flow rate through the electrolytic cell, the electric conductivity, temperature and quality of water supplied to the electrolytic cell and so forth. Various countermeasures for adjusting the electrolyzing capacity of an electrolytic cell have been proposed, and one of the countermeasures is to change over the voltage tap of a power source transformer to adjust the dc supply voltage among a plurality of stages. Another countermeasure is to vary the flow rate of water by means of a flow rate adjusting valve.

By the way, a conventional electrolytic ion water producing apparatus is normally constructed such that a user can manually change over the voltage tap of a power source transformer in accordance with flow rate or the quality of water to roughly adjust the electrolyzing capacity of the electrolytic cell when the electrolytic ion water producing apparatus is in use. Here, the flow rate varies in one of time zones used, and also the temperature of water varies over a comparatively wide range depending on the season and the time. However, in order to keep the electrolyzing capacity fixed against variation, fine adjustment of the flow rate cannot be avoided, making manual operation by the user very complicated. Further, since the adjustment depends much upon judgment of the user it is difficult to always obtain the desired PH value of electrolytic ion water. Accordingly, it is desired to control the dc power supply to the electrolytic cell in a stepless manner to control the electrolyzing capacity of the electrolytic cell automatically to a fixed value against a variation of the flow rate or the quality of water.

A solution to the problem is disclosed, for example, in Japanese Utility Model Laid-Open Application No. 1-163494. According to the proposed solution, electrolytic current is adjusted to one of a plurality of stages by manual operation of an electrolyzing strength adjusting switch. Further, according to the proposed electrolytic ion water producing apparatus, electrolytic current supplied to the electrolytic cell is detected and controlled so that the value thereof coincides with a current value set by manual selective operation of the electrolyzing strength adjusting switch.

With the proposed solution, however, since an electrolytic current is controlled to one of a plurality of stages in response to manual operation of the electrolyzing strength adjusting switch, when the flow rate or the quality of water varies, the electrolyzing capacity cannot be adjusted appropriately against such variation.

SUMMARY OF THE INVENTION

It is an object of the present invention to provide a control apparatus which can control a continuous electrolytic ion water producing apparatus so that the electrolyzing current in an electrolytic cell is kept fixed against a variation of the flow rate or the quality of water upon passage of water to always achieve optimization and stabilization of the electrolytic ion water produced.

In order to attain the foregoing object, according to the present invention, there is provided a control apparatus for a continuous electrolytic ion water producing apparatus which includes an electrolytic cell, a pair of negative and positive electrodes accommodated in the electrolytic cell and a power source circuit for applying a dc voltage between the negative and positive electrodes, which comprises a range change-over switch for adjusting the electrolytic current of the electrolytic cell to one of a plurality of stages, a switching regulator connected in the power source circuit for controlling the dc voltage of the power source circuit in accordance with a pulse width signal, and a control unit for setting the pulse width to one of a plurality of stages in response to a signal from the range change-over switch, correcting the thus set pulse width in accordance with a detected variation of flow rate or the quality of water, and supplying a signal of the thus corrected pulse width to the switching regulator.

In the control apparatus for a continuous electrolytic ion water producing apparatus, when the electrolytic cell is energized by the power source circuit upon passage of water through the electrolytic cell, the water is electrolyzed in the electrolytic cell to produce electrolytic ion water, which is thus obtained from the continuous electrolytic ion water producing apparatus. In this instance, if the range change-over switch is manually operated, then the dc supply voltage of the power source circuit is controlled by the control unit and the switching regulator to produce an electrolyzing voltage in accordance with the position of the range change-over switch, and the water is thus electrolyzed at the electrolyzing strength of the electrolyzing voltage thus produced. Then, if the flow rate of water or the water temperature varies during such electrolyzing operation, then the pulse width of the switching regulator is corrected by the control unit so that the electrolyzing strength is automatically adjusted in accordance with the detected change in condition so as to always keep the electrolyzing capacity of the electrolytic cell fixed.

Thus, with the control apparatus of the invention, since the electrolyzing strength is automatically corrected against a variation of the flow rate or the water quality, the electrolyzing capacity during use is always kept fixed accurately. Consequently, the desired electrolytic ion water can be obtained stably, and a complicated manual operation by a user is unnecessary. Further, since the electrolyzing strength is adjusted in response to a change in position of the range change-over switch by the switching regulator provided in the power source circuit for the electrolytic cell and the electrolyzing strength is corrected in accordance with a variation of the flow rate or the like, the control can be effected readily with certainty and also the construction is simplified. Further, since the electrolyzing strength is finely adjusted in accordance with a correction amount set in accordance with the flow rate of water or the water quality, the correction can be performed in accordance with the varying condition.

The control unit may include a driver for rendering the switching regulator operative or inoperative, oscillating means, pulse width controlling means for setting the pulse width to one of the plurality of stages in response to a signal from the range change-over switch and outputting a pulse signal representative of the thus set pulse width to the driver, correction amount setting means for setting a correction amount in response to a variation of the flow rate or the water temperature, and correcting means for correcting the pulse width of an output of the pulse width controlling means in accordance with the correction amount set by the correction amount setting means.

The above and other objects, features and advantages of the present invention will become apparent from the following description and the appended claims, taken in conjunction with the accompanying drawings in which like parts or elements are denoted by like reference characters.

DETAILED DESCRIPTION OF THE PREFERRED EMBODIMENT

Figure 1:
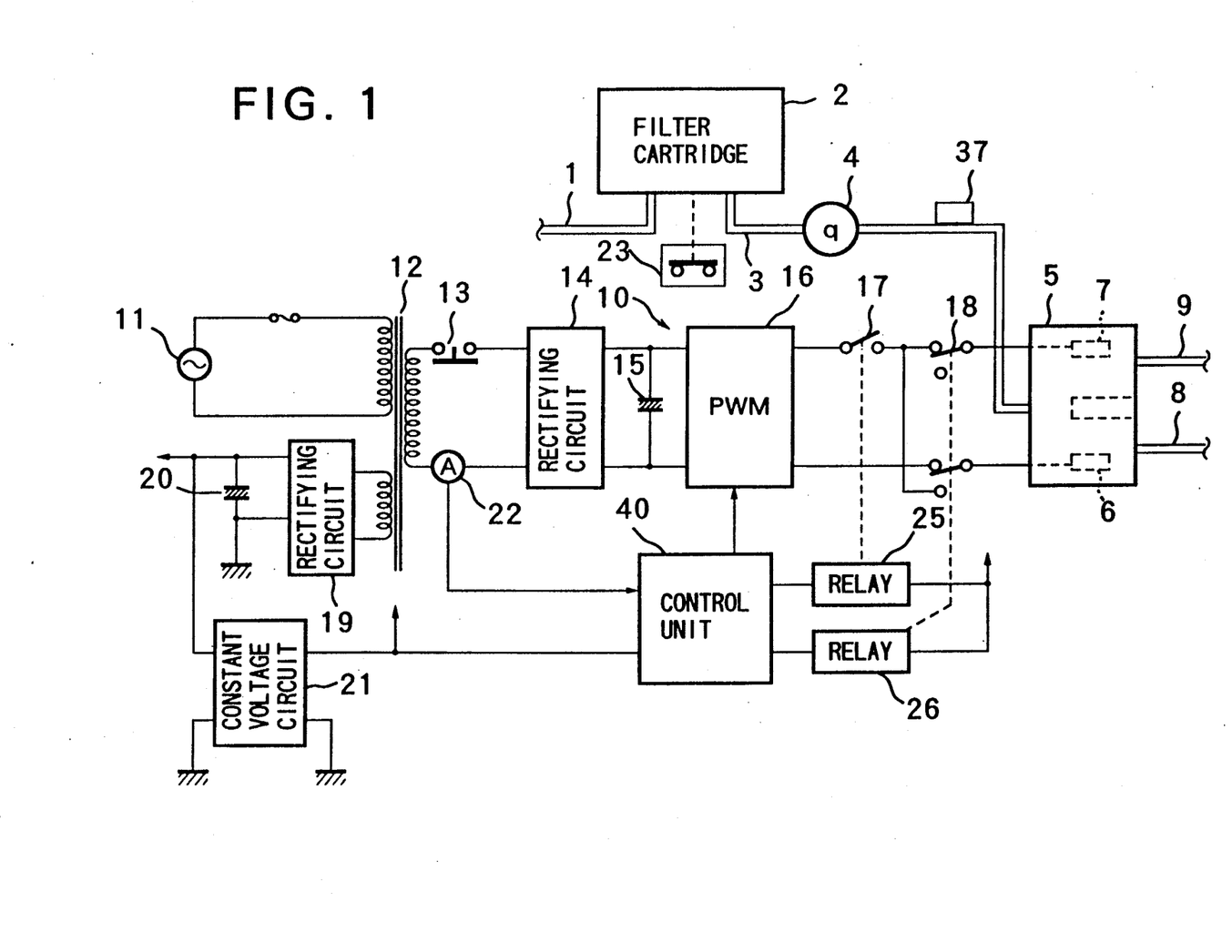
FIG. 1 is a circuit diagram schematically showing a water flow route and a power source circuit of a continuous electrolytic ion producing apparatus in which a control apparatus according to the present invention is incorporated.

Referring first to FIG. 1, there is shown a continuous electrolytic ion water producing apparatus in which a control apparatus according to the present invention is incorporated. The continuous electrolytic ion water producing apparatus shown includes an inlet pipe 1 serving as a water pipe adapted to be connected to a city water pipe or the like to introduce city water into the continuous electrolytic ion water producing apparatus. The inlet pipe 1 communicates with a filter cartridge 2 for removing residual chlorine in city water introduced thereto. An outlet pipe 3 of the filter cartridge 2 communicates with an electrolytic cell 5 by way of a flow rate sensor 4 of the rotary type. The electrolytic cell 5 is of the enclosed type, and the inside thereof is partitioned by a partition or the like into two sections in which a negative electrode 6 and a positive electrode 7 are disposed separately. An outlet pipe 8 for alkali ion water is connected to the electrolytic cell 5 adjacent the negative electrode 6 while another outlet pipe 9 for acid ion water is connected to the electrolytic cell 5 adjacent the positive electrode 7 so that alkali ion water and acid ion water can be extracted separately from the output pipes 8 and 9, respectively.

A power source circuit 10 is provided for the electrolytic cell 5 and includes an ac power source 11 connected to the primary winding of a power source transformer 12, a secondary winding of which is connected to a rectifying circuit 14 by way of a bimetal thermostat 13 for the prevention of overheating. The positive and negative poles of the dc voltage output side of the rectifying circuit 14 are connected by way of a smoothing capacitor 15 to a switching regulator 16 of the pulse width modulating type (PWM) for controlling dc power supply in a stepless manner. The outputs of the switching regulator 16 are connected individually to the positive electrode 7 and the negative electrode 6 by way of a power source switch 17 and a polarity reversing switch 18. Meanwhile, in order to control power, another secondary winding of the power source transformer 12 is connected by way of another rectifying circuit 19 and another smoothing capacitor 20 to a constant voltage circuit 21, which is connected to a control unit 40 so that a fixed voltage may be supplied to the control unit 40.

Figure 2:
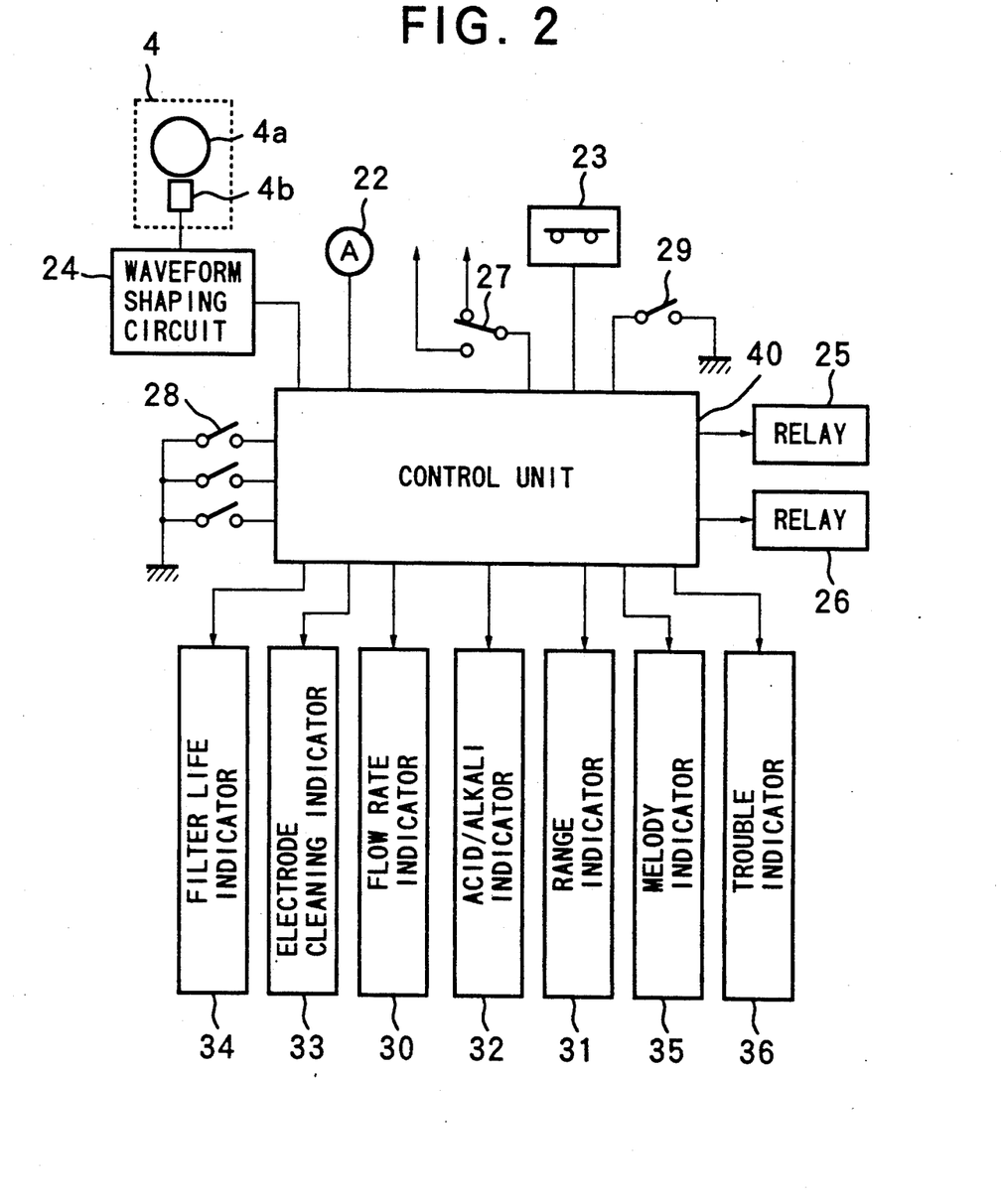
FIG. 2 is a schematic circuit diagram of an electric control system for the continuous electrolytic ion water producing apparatus shown in FIG. 1.

Referring now to FIG. 2, there is shown an electric control system for the continuous electrolytic ion water producing apparatus shown in FIG. 1. Referring also to FIG. 1, a current sensor 22 for detecting an electrolytic current is provided at the secondary winding of the power source transformer 12 connected to the rectifying circuit 14, and an output signal of the current sensor 22 is inputted to the control unit 40. A reset switch 23 is provided for the filter cartridge 2 and resets upon exchanging of a filter, and a switch signal of the reset switch 23 is inputted to the control unit 40. The flow rate sensor 4 detects rotation of an electromagnetic vane wheel 4a disposed in the water pipe line by means of a Hall effect element 4b and outputs corresponding pulses. The pulse signal is inputted to the control unit 40 by way of a waveform shaping circuit 24. The control unit 40 counts pulses of the pulse signal from the flow rate sensor 4 to detect the flow rate of the water, and the power source switch 17 is switched on and off by means of a relay 25 in response to the flow rate thus detected. Further, after flow of water stops, a scale removing time is set in response to the amount of water passing therethrough, and the polarity reversing switch 18 is changed over to the oppositely connecting position by means of another relay 26, in accordance with the scale removing time thus sent to automatically remove scale from the positive and negative electrodes 7 and 6.

Further connected to the control unit 40 are an acid-alkali change-over switch 27 which is to be operated when one of acid ion water and alkali ion water is to be used, a range change-over switch device 28 for adjusting the electrolyzing strength in a stepless manner, and a melody switch 29 which is manually operated when acid ion water is to be used. The electric control system further includes, as indicating means in the form of LEDs (light emitting diodes), a flow rate indicator 30, a range indicator 31, an acid/alkali indicator 32, an electrode cleaning indicator 33 which indicates that scale should be removed, a filter life indicator 34, a melody indicator 35 which gives a warning to inhibit drinking of water when acid ion water is to be used, and a trouble indicator 36 which indicates that the power source transformer 12 has overheated all connected to the control unit 40.

Figure 3:
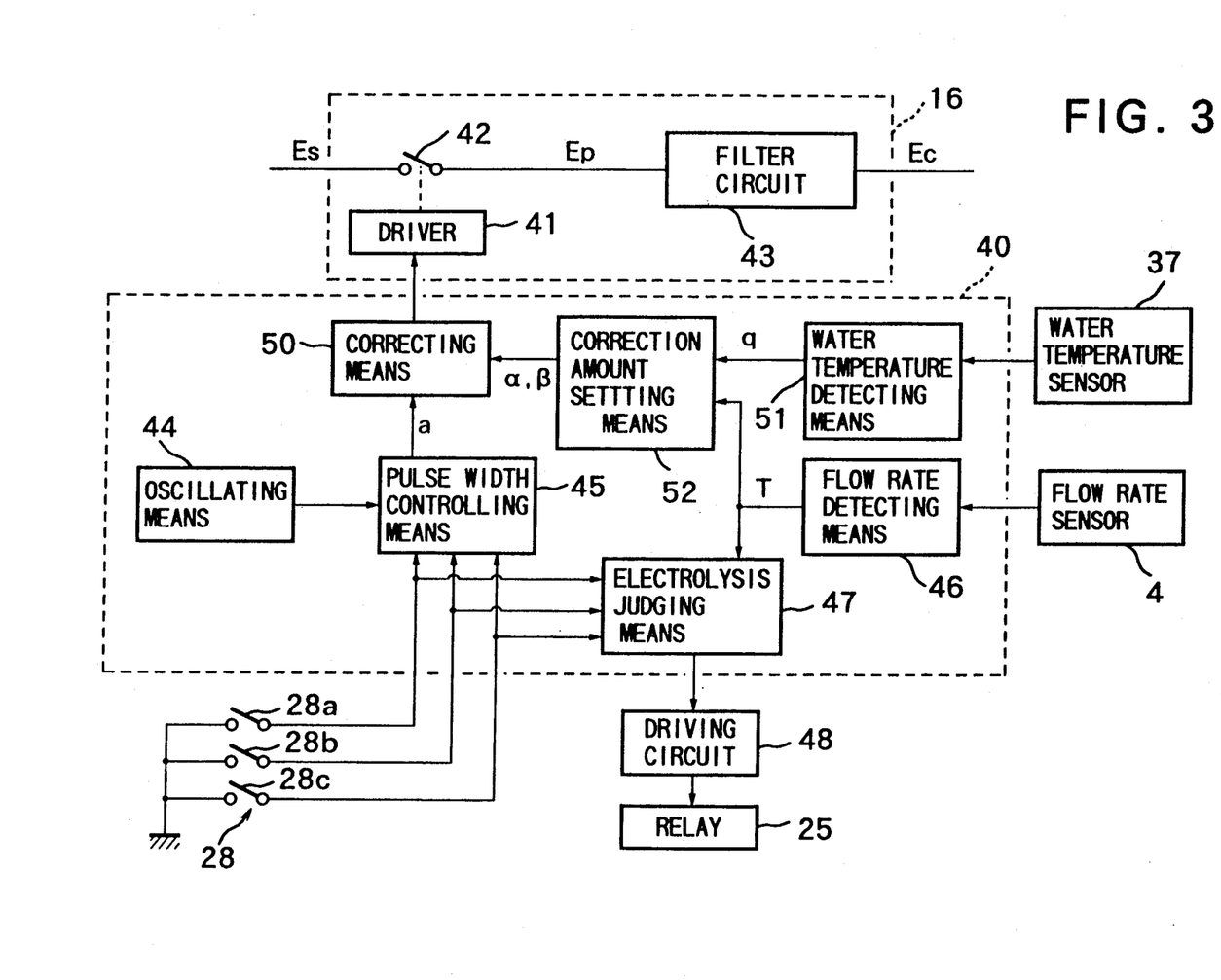
FIG. 3 is a block diagram of the control circuit of the control system shown in FIG. 2.

Referring now to FIG. 3, there is shown a control circuit of the electric control system shown in FIG. 2. The range change-over switch device 28 of the control circuit includes, for example, three switches 28a, 28b and 28c. The range change-over switch device 28 is constructed such that, when it should be set to its non-electrolyzing position, that is, when the electrolyzing strength should be equal to zero, the switches 28a to 29c are positioned in their off positions; when the electrolyzing strength should be weak, only the switch 28a is turned on; when the electrolyzing strength should be intermediate, the switch 28b is turned on; and when the electrolyzing strength should be strong, the switch 28c is turned on. When the range is changed, the range change-over switch device 28 outputs a signal in accordance with the positions of the switches 28a to 28c.

The switching regulator 16 includes a switching element 42 which is turned on and off by a driver 41, and a filter circuit 43 is connected to the switching element 42. The filter circuit 43 smoothes a pulse voltage Ep supplied thereto to produce an electrolyzing voltage Ec corresponding to a pulse width a of the pulse voltage Ep.

The control unit 40 includes pulse width controlling means 45 for receiving a pulse signal of a predetermined frequency from oscillating means 44. A signal from the range change-over switch device 28 is inputted to the pulse width controlling means 45. The pulse width controlling means 45 sets the pulse width a to one of a plurality of stages shown in FIG. 4 in response to the signal from the range change-over switch device 28, and outputs a pulse signal of the pulse width a to the driver 41. The control unit 40 further includes flow rate detecting means 46 for receiving a pulse signal from the flow rate sensor 4 and counting the number of pulses of the received pulse signal to detect a flow rate q. The flow rate q and the signal of the range change-over switch device 28 are inputted to electrolysis judging means 47, which the flow rate q is compared with a preset reference flow rate. Thus, when the flow rate q is lower than the preset reference flow rate, the electrolysis judging means 47 outputs an off signal to the relay 25 by way of a driving circuit 48. On the other hand, when the range change-over switch device 28 is in its electrolyzing position with one of the switches 28a to 28c in its on position and the flow rate q is equal to or higher than the reference flow rate, the electrolysis judging means 47 outputs an on signal to the relay 25.

The control unit 40 further includes, as a control system for correcting the electrolyzing capacity against a variation of the flow rate or the quality of water, correcting means 50 provided on the output side of the pulse width controlling means 45. Meanwhile, a water temperature sensor 37 for detecting the temperature of water is provided in the water pipe line in addition to the flow rate sensor 4. A signal of the water temperature sensor 37 is inputted to water temperature detecting means 51, at which a water temperature T is detected. The flow rate q and the water temperature T are inputted to correction amount setting means 52. When the flow rate q varies in an increasing direction, in order to keep the electrolyzing capacity fixed, also the electrolyzing strength must be corrected in an increasing direction, and to this end, the correction amount α is set in proportion to the flow rate q as seen from the diagram of FIG. 5. On the contrary, when the water temperature T rises, the electricity easily flows therethrough, and accordingly, in order to keep the electrolyzing capacity fixed similarly against such variation, the electrolyzing strength must necessarily be corrected in a decreasing direction. To this end, the correction amount β is set in reverse proportion to the water temperature T as seen from the diagram of FIG. 6. The correction amount α or β is inputted to the correcting means 50, by which the correction amount α or β is added to the pulse width a to obtain a corrected pulse width.

In operation, city water is normally introduced into the electrolytic cell 5 by way of the inlet pipe 1. A fixed voltage is supplied to the control unit 40 from the constant voltage circuit 21 connected to the rectifying circuit 19 on the secondary winding side of the power source transformer 12 so that the control unit 40 can execute its controlling operation. Thus, when neither alkali ion water nor acid ion water is to be used, no pulse signal is inputted from the flow rate sensor 4 to the control unit 40. Consequently, the electrolysis judging means 47 judges a rest of electrolyzing operation and outputs an off signal to the relay 25. Consequently, the power switch 17 is turned off by the relay 25 to thereby deenergize the electrolytic cell 5.

Then, when water is allowed to pass through the continuous electrolytic ion water producing apparatus, the city water passes through the filter cartridge 2, by which residual chlorine of the city water is removed. Then, the city water flows into the electrolytic cell 5. Thereupon, a pulse signal from the flow rate sensor 4 is inputted to the control unit 40, at which a flow rate q is detected. Then, if the range change-over switch device 28 is at its non-electrolyzing position in which all of the switches 28a to 28c are in their off positions, a non-electrolyzing operation is determined by the electrolytic judging means 47 similarly as described above. Consequently, the electrolytic cell 5 remains in a non-electrolyzing condition. Accordingly, the city water, from which chlorine has been removed, is obtained from the continuous electrolytic ion water producing apparatus.

Figure 7:
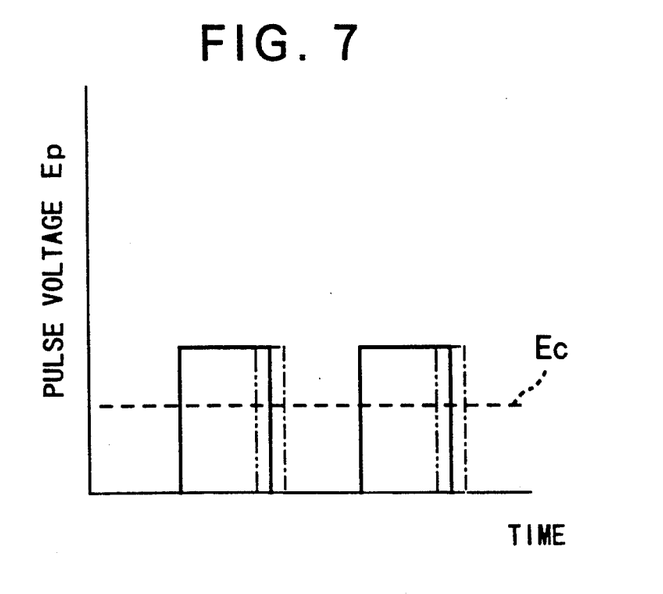
FIG. 7 is a diagram showing a characteristic of a pulse voltage.

On the other hand, if, upon passage of water, the range change-over switch device 28 is manually changed to one of the electrolyzing strength range positions in accordance with a flow rate then, an electrolyzing operation is determined by the electrolysis judging means 47, and an on signal is outputted from the electrolysis judging means 47 to the relay 25 so that the power source switch 17 is switched on by the relay 25. Consequently, the transformed voltage on the secondary winding side of the power source transformer 12 is converted into a dc voltage by the rectifying circuit 14, smoothed by the smoothing capacitor 15 and inputted to the switching regulator 16. In this instance, the signal from the range change-over switch device 28 is also inputted to the pulse width controlling means 45 of the control unit 40, by which a pulse width a is set in accordance with the signal thus received, and a pulse signal of the pulse width a is outputted to the driver 41. Consequently, the switching element 42 of the switching regulator 16 operates to switch on and off in accordance with the pulse width a to produce such a pulse voltage Ep as shown in FIG. 7. The pulse voltage Ep is processed by the filter circuit 43.

Thus, a dc supply voltage Es on the transformer 12 is controlled to a predetermined electrolyzing voltage Ec in accordance with the range change-over condition of the range change-over switch device 28. The electrolyzing voltage Ec is applied to the positive electrode 7 and the negative electrode 6 of the electrolytic cell 5 by way of the power source switch 17 and the polarity reversing switch 18 in its regularly connecting position. Consequently, city water in the electrolytic cell 5 is electrolyzed at the electrolyzing voltage Ec. Thus, if the polarity on the electrode side is changed over by the polarity reversing switch 18 to the outlet pipe 8 on the negative electrode 6 side, then alkali ion water containing comparatively great amount of negative ions therein is obtained, but, on the contrary, if the polarity is changed over to the outlet pipe 9 on the positive electrode 7 side, then acid ion water containing a comparatively great amount of positive ions therein is obtained.

Figure 4:
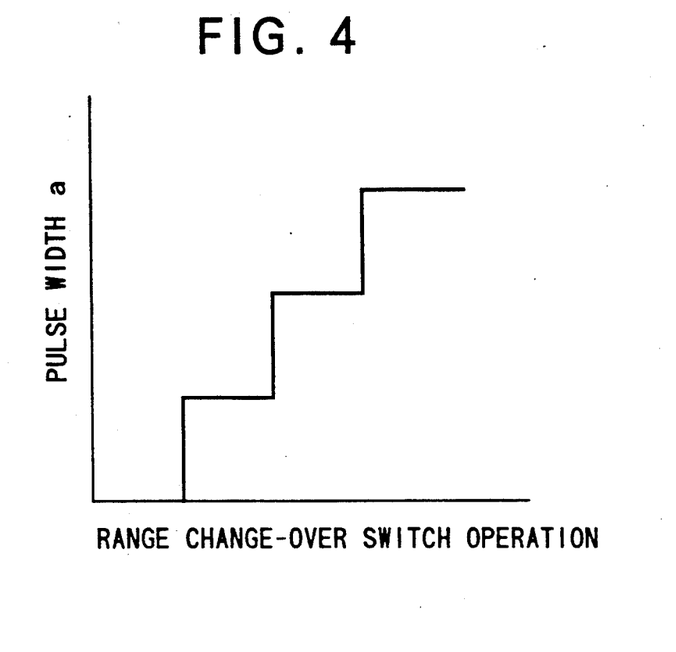
Fig. 4 is a diagram showing a pulse width control map of pulse width controlling means of the control circuit shown in FIG. 3.

In this instance, when the flow rate is comparatively low, if the range change-over switch device 28 is operated so as to decrease the electrolyzing strength, then the pulse width a is set to a smaller value as seen from the map of FIG. 4. Consequently, the electrolyzing voltage Ec is controlled to a lower value and the electrolyzing strength of the electrolytic cell 5 is adjusted to a lower value. On the contrary, when the flow rate is high, the pulse width a will be successively set to a higher value by manual operation of the range change-over switch device 28. Consequently, the electrolyzing voltage Ec is controlled to a higher value and the electrolyzing strength is adjusted to a higher value. Thus, the PH value of electrolytic ion water produced is always made appropriate in accordance with flow rate.

Figure 5:
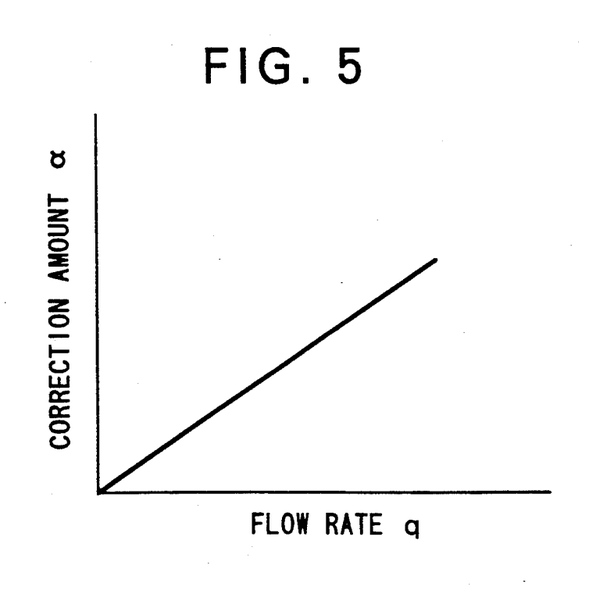
FIG. 5 is a diagram showing a correction map for a flow rate.
Figure 6:
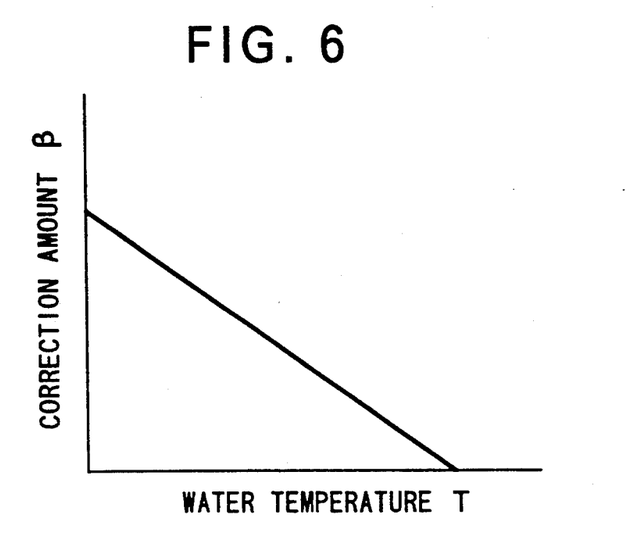
FIG. 6 is a diagram showing a correction map for water temperature.

Meanwhile, upon such electrolyzing operation as described above, a flow rate q and a water temperature T of the water pipe line are detected by the sensors 4 and 37, respectively, and varying conditions of the flow rate q and the water temperature T are judged by the correction amount setting means 52. Thus, if, for example, the flow rate q varies in an increasing direction depending upon a time zone in which the continuous electrolyzing ion water producing apparatus is used, then a correction amount α determined from the map of FIG. 5 is outputted to the correcting means 50, by which the pulse width a is corrected in an increasing direction as seen from an alternating long and short dash line in FIG. 7. Consequently, the electrolyzing strength is automatically adjusted finely to a somewhat higher value in response to the varying condition to keep the electrolyzing capacity fixed. On the other hand, when the temperature of water rises, for example, in the daytime in summer, so that the quality of water varies to such a condition that the electricity is conducted more easily, a correction amount β determined from the map of FIG. 6 is outputted similarly and the pulse width a is corrected in a decreasing direction as indicated by an alternating long and two short dashes line in FIG. 7. Consequently, in this instance, the electrolyzing capacity is finely adjusted to a somewhat lower value in accordance with the degree to which the electricity easily flows so that the electrolyzing capacity is kept fixed similarly. Consequently, even if the flow rate q or the water temperature T varies when the continuous electrolytic ion water producing apparatus is used, the desired PH value of the electrolytic ion water produced can be obtained stably.

While the preferred embodiment of the present invention is described above, the electrolyzing strength of the electrolytic cell can be otherwise corrected using some other factor than the flow rate and the water temperature.

Having now fully described the invention, it will be apparent to one of ordinary skill in the art that may changes and modifications can be made thereto without departing from the spirit and scope of the invention as set forth herein.

What is claimed is:

1. A control circuit for controlling operation of an electrolytic cell for treating an incoming water flow to produce a continuous flow of alkali and acid ion water wherein the electrolytic cell has a pair of negative and positive electrodes and a power source circuit for supplying a dc voltage, said control circuit comprising:
    means for detecting a variation in rate of the incoming water flow;
    a range change-over switch for adjusting the dc voltage to provide an electrolytic voltage to said electrolytic cell at one of a plurality of stages:
    a switching regulator connected in said power source circuit for controlling pulse width of the electrolytic voltage in accordance with a pulse width signal; and
    a control unit for setting a pulse width for electrolytic voltage to one of a plurality of stages in response to a signal from said range change-over switch, for correcting the thus set pulse width in accordance with a detected variation in water flow rate, and for supplying a signal corresponding to the thus corrected pulse width, as said pulse width signal to said switching regulator.

2. A control circuit according to claim 1, wherein said control unit comprises driver means for rendering said switching regulator operative or inoperative, oscillating means for generating a pulse signal of a predetermined frequency, pulse width controlling means for setting the pulse width of said pulse signal to one of the plurality of stages in response to a signal from said range change-over switch and outputting a pulse width signal of the thus set pulse width to said driver means, correction amount setting means for setting a correction amount in response to a detected variation of the water flow rate, and correcting means for correcting the pulse width signal output by said pulse width controlling means in accordance with the correction amount set by said correction amount setting means.

3. A control circuit in accordance with claim 2 wherein said correction amount is proportional to the detected flow rate.

4. A control circuit for controlling operation of an electrolytic cell for treating an incoming water flow to produce a continuous flow of alkali and acid ion water wherein the electrolytic cell has a pair of negative and positive electrodes and a power source circuit for supplying a dc voltage, said control circuit comprising:
    means for detecting a variation in temperature of the incoming water flow;
    a range change-over switch for adjusting the dc voltage to provide an electrolytic voltage to said electrolytic cell at one of a plurality of stages:
    a switching regulator connected in said power source circuit for controlling pulse width of the electrolytic voltage in accordance with a pulse width signal; and a control unit for setting a pulse width for electrolytic voltage to one of a plurality of stages in response to a signal from said range change-over switch, for correcting the thus set pulse width in accordance with a detected variation in the water temperature, and for supplying a signal corresponding to the thus corrected pulse width, as said pulse width signal to said switching regulator.

5. A control circuit according to claim 4, wherein said control unit comprises driver means for rendering said switching regulator operative or inoperative, oscillating means for generating a pulse signal of a predetermined frequency, pulse width controlling means for setting the pulse width of said pulse signal to one of the plurality of stages in response to a signal from said range change-over switch and outputting a pulse width signal of the thus set pulse width to said driver means, correction amount setting means for setting a correction amount in response to a detected variation of the water temperature, and correcting means for correcting the pulse width signal output by said pulse width controlling means in accordance with the correction amount set by said correction amount setting means.

6. A control circuit in accordance with claim 5 wherein said correction amount is inversely proportional to the detected water temperature.

7. A control circuit for controlling operation of an electrolytic cell for treating an incoming water flow to produce a continuous flow of alkali and acid ion water wherein the electrolytic cell has a pair of negative and positive electrodes and a power source circuit for supplying a dc voltage, said control circuit comprising:

means for detecting a variation in rate of the incoming water flow;

means for detecting a variation in temperature of the incoming water flow;

a range change-over switch for adjusting the dc voltage to provide an electrolytic voltage to said electrolytic cell at one of a plurality of stages:

a switching regulator connected in said power source circuit for controlling pulse width of the electrolytic voltage in accordance with a pulse width signal; and a control unit for setting a pulse width for electrolytic voltage to one of a plurality of stages in response to a signal from said range change-over switch, for correcting the thus set pulse width in accordance with a detected variation in water flow rate and a detected variation in the temperature of the incoming water flow, and for supplying a signal corresponding to the thus corrected pulse width, as said pulse width signal to said switching regulator.

8. A control circuit according to claim 7, wherein said control unit comprises driver means for rendering said switching regulator operative or inoperative, oscillating means for generating a pulse signal of a predetermined frequency, pulse width controlling means for setting the pulse width of said pulse signal to one of the plurality of stages in response to a signal from said range change-over switch and outputting a pulse width signal of the thus set pulse width to said driver means, correction amount setting means for setting a correction amount in response to a detected variation of the water flow rate and a detected variation in temperature of the incoming water flow, and correcting means for correcting the pulse width signal output by said pulse width controlling means in accordance with the correction amount set by said correction amount setting means.

9. A control circuit according to claim 8 wherein said correction amount is proportional to the detected flow rate and inversely proportional to the detected water temperature.

* * * * *